(12) United States Patent
Kim et al.

(10) Patent No.: US 10,090,899 B2
(45) Date of Patent: Oct. 2, 2018

(54) METHOD FOR DETERMINING PRECODER FOR HYBRID BEAMFORMING IN WIRELESS COMMUNICATION SYSTEM, AND APPARATUS THEREFOR

(71) Applicant: LG ELECTRONICS INC., Seoul (KR)

(72) Inventors: Kitae Kim, Seoul (KR); Jiwon Kang, Seoul (KR); Kilbom Lee, Seoul (KR); Heejin Kim, Seoul (KR); Kungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/748,344

(22) PCT Filed: Mar. 17, 2016

(86) PCT No.: PCT/KR2016/002712
§ 371 (c)(1),
(2) Date: Jan. 29, 2018

(87) PCT Pub. No.: WO2017/018631
PCT Pub. Date: Feb. 2, 2017

(65) Prior Publication Data
US 2018/0227022 A1    Aug. 9, 2018

Related U.S. Application Data

(60) Provisional application No. 62/198,139, filed on Jul. 29, 2015.

(51) Int. Cl.
*H04B 7/02* (2018.01)
*H04B 7/0456* (2017.01)
*H04B 7/06* (2006.01)

(52) U.S. Cl.
CPC ......... *H04B 7/0456* (2013.01); *H04B 7/0617* (2013.01)

(58) Field of Classification Search
CPC .......................... H04B 7/0456; H04B 7/0617
(Continued)

(56) References Cited

U.S. PATENT DOCUMENTS

| | | | |
|---|---|---|---|
| 2011/0007685 A1* | 1/2011 | Ma | H01Q 25/00 370/315 |
| 2013/0057432 A1 | 3/2013 | Rajagopal et al. | |

(Continued)

FOREIGN PATENT DOCUMENTS

| | | |
|---|---|---|
| KR | 10-2013-0110396 A | 10/2013 |
| WO | WO 2015/065157 A1 | 5/2015 |

*Primary Examiner* — Dhaval Patel
(74) *Attorney, Agent, or Firm* — Birch, Stewart, Kolasch & Birch, LLP

(57) ABSTRACT

Disclosed in the present application is a method by which a terminal receives a signal, to which hybrid beamforming is applied, from a base station in a wireless communication system. More specifically, the method comprises the steps of: acquiring information on a first precoder for first beamforming of the hybrid beamforming; generating information on a precompensation precoder for the first beamforming by using the information on the first precoder; reporting the information on the precompensation precoder to the base station; and receiving, from the base station, a signal to which the precompensation precoder, the first beamforming, and second beamforming are applied, wherein the precompensation precoder adjusts, to zero degrees, a boresight direction of a signal to which the first precoder for the first beamforming is applied, and a second precoder for the second beamforming is configured to enable the signal to be transmitted in a final boresight direction on the basis of a boresight direction of zero degrees.

12 Claims, 10 Drawing Sheets

(58) Field of Classification Search
USPC ....... 375/260, 267, 295, 316, 219, 224, 227,
375/259, 299; 370/203, 204, 208, 209,
370/328, 280, 335, 478
See application file for complete search history.

(56) References Cited

U.S. PATENT DOCUMENTS

| | | |
|---|---|---|
| 2013/0229307 A1 | 9/2013 | Chang et al. |
| 2014/0355707 A1* | 12/2014 | Kim .................... H04B 7/0469 375/267 |
| 2016/0353424 A1* | 12/2016 | Stirling-Gallacher ...................... H04B 7/0626 |

* cited by examiner

METHOD FOR DETERMINING PRECODER FOR HYBRID BEAMFORMING IN WIRELESS COMMUNICATION SYSTEM, AND APPARATUS THEREFOR

CROSS REFERENCE TO RELATED APPLICATIONS

This application is the National Phase of PCT International Application No. PCT/KR2016/002712, filed on Mar. 17, 2016, which claims priority under 35 U.S.C. 119(e) to U.S. Provisional Application No. 62/198,139, filed on Jul. 29, 2015, all of which are hereby expressly incorporated by reference into the present application.

TECHNICAL FIELD

The present disclosure generally relates to a wireless communication system, and more particularly, to a method and apparatus for determining a precoder for hybrid beamforming in a wireless communication system.

BACKGROUND ART

A legacy beamforming technique using multiple antennas can be mainly classified into an analog beamforming technique and a digital beamfouning technique depending on a location to which a beamforming weight vector/precoding vector is applied.

First of all, the analog beamforming technique is a typical beamforming technique applied to an initial multi-antenna structure. The analog beamforming technique divides an analog signal of which digital signal processing is completed into a plurality of paths and sets phase-shift (PS) and power amplification (PA) to each of a plurality of the paths to perform beamforming. FIG. 1 is a diagram for an example of a legacy analog beamforming technique.

Referring to FIG. 1, it is able to see a structure that an analog signal derived from a single digital signal is processed by a power amplifier and a phase shifter connected to each antenna to perform analog beamforming. In particular, the phase shifter and the power amplifier process complex weights at an analog stage. In this case, a radio frequency (RF) chain corresponds to a processing block in which a single digital signal is converted into an analog signal.

However, according to the analog beamforming technique, since accuracy of a beam is determined according to characteristics of elements of the phase shifter and the power amplifier, the analog beamforming technique is advantageous for the narrow band transmission due to the control characteristics of the elements. On the other hand, since the analog beamforming technique has a hardware structure incapable of implementing multi-stream transmission, multiplexing gain for increasing a transmission rate is relatively small and it is difficult to perform beamforming per user based on orthogonal resource allocation.

Unlike the analog beamforming technique, the digital beamforming technique performs beamforming at a digital stage using a baseband process to maximize diversity and multiplexing gain in MIMO environment.

Referring to FIG. 2, digital beamforming can be performed by performing precoding in a baseband process. Unlike FIG. 1, an RF chain includes a power amplifier. This is because a complex weight derived for beamforming is directly applied to a transmission data.

And, since the digital beamforming technique is able to differently perform beamforming according to a user, it is able to support multi user beamforming at the same time. Since the digital beamforming technique is able to perform independent beamforming according to a user to which an orthogonal resource is allocated, the digital beamforming technique has characteristics that scheduling flexibility is high and it is able to manage a transmitting end in accordance with a system purpose. Moreover, when a technique such as Multiple-Input Multiple-Output (MIMO)-OFDM (Orthogonal Frequency Division Multiplexing) is applied in a broadband transmission environment, it may form an independent beam for each subcarrier. Therefore, the digital beamforming technique can maximize the maximum transmission rate of a single user based on increased system capacity and enhanced beam gain.

In accordance with the aforementioned advantages and disadvantages, digital beamforming-based MIMO technology has been introduced in the current 3G/4G system.

DISCLOSURE

Technical Problem

An aspect of the present disclosure devised to solve the conventional problem is to provide a method and apparatus for determining a precoder for hybrid beamforming in a wireless communication system.

Technical Solution

In an aspect of the present disclosure, a method of receiving, from a base station, a signal to which hybrid beamforming is applied by a user equipment in a wireless communication system includes acquiring information about a first precoder for first beamforming in the hybrid beamforming, generating information about a pre-compensation precoder for the first beamforming, using the information about the first precoder, reporting the information about the pre-compensation precoder to the base station, and receiving, from the base station, a signal to which the pre-compensation precoder, the first beamforming, and second beamforming are applied. The pre-compensation precoder is configured to adjust a boresight of a signal to which the first precoder for the first beamforming is applied to zero degrees, and a second precoder for the second beamforming is configured to transmit the signal in a final boresight with respect to the zero-degree boresight.

In another aspect of the present disclosure, a user equipment in a wireless communication system to which hybrid beamforming is applied includes a wireless communication module configured to transmit and receive signals to and from a base station, and a processor configured to process the signals.

The processor is configured to generate information about a pre-compensation precoder for first beamforming, using information about a first precoder for the first beamforming in the hybrid beamforming, and to control the wireless communication module to report the information about the pre-compensation precoder to the base station, and the wireless communication module is configured to receive, from the base station, a signal to which the pre-compensation precoder, the first beamforming, and second beamforming are applied. The pre-compensation precoder is configured to adjust a boresight of a signal to which the first precoder for the first beamforming is applied to zero degrees, and a second precoder for the second beamforming is configured to transmit the signal in a final boresight with respect to the zero-degree boresight.

Preferably, a beam index corresponding to the first beamforming may be detected by a beam scanning process, and the information about the first precoder may correspond to the detected beam index. Or the information about the first precoder may be received from the base station.

More preferably, information about the second precoder may be calculated based on the information about the first precoder. Additionally, a final precoder may be configured with the pre-compensation precoder and the second precoder, and reported to the base station.

Or, if the information about the first precoder is detected from a beam index corresponding to the first beamforming, the information about the pre-compensation precoder for the first beamforming may include information about the beam index corresponding to the first beamforming.

In the above example, the first beamforming is analog beamforming, and the second beamforming is digital beamforming.

Advantageous Effects

According to the embodiments of the present disclosure, a precoder, that is, a precoding matrix index optimized for a wireless channel environment may be determined and reported by a hybrid beamforming technique.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE FOR CARRYING OUT THE INVENTION

The configuration, operation and other features of the present disclosure will be understood by the embodiments of the present disclosure described with reference to the accompanying drawings.

Hereinafter, a Multiple-Input Multiple-Output (MIMO) system will be described. In the MIMO system, multiple transmission antennas and multiple reception antennas are used. By this method, data transmission/reception efficiency can be improved. That is, since a plurality of antennas is used in a transmitter or a receiver of a wireless communication system, capacity can be increased and performance can be improved. Hereinafter, MIMO may also be called "multi-antenna".

In the multi-antenna technique, a single antenna path is not used for receiving one message. Instead, in the multi-antenna technique, data fragments received via several antennas are collected and combined so as to complete data. If the multi-antenna technique is used, a data transfer rate may be improved within a cell region having a specific size or system coverage may be increased while ensuring a specific data transfer rate. In addition, this technique may be widely used in a mobile communication terminal, a repeater and the like. According to the multi-antenna technique, it is possible to overcome a limit in transmission amount of conventional mobile communication using a single antenna.

Figure 1:
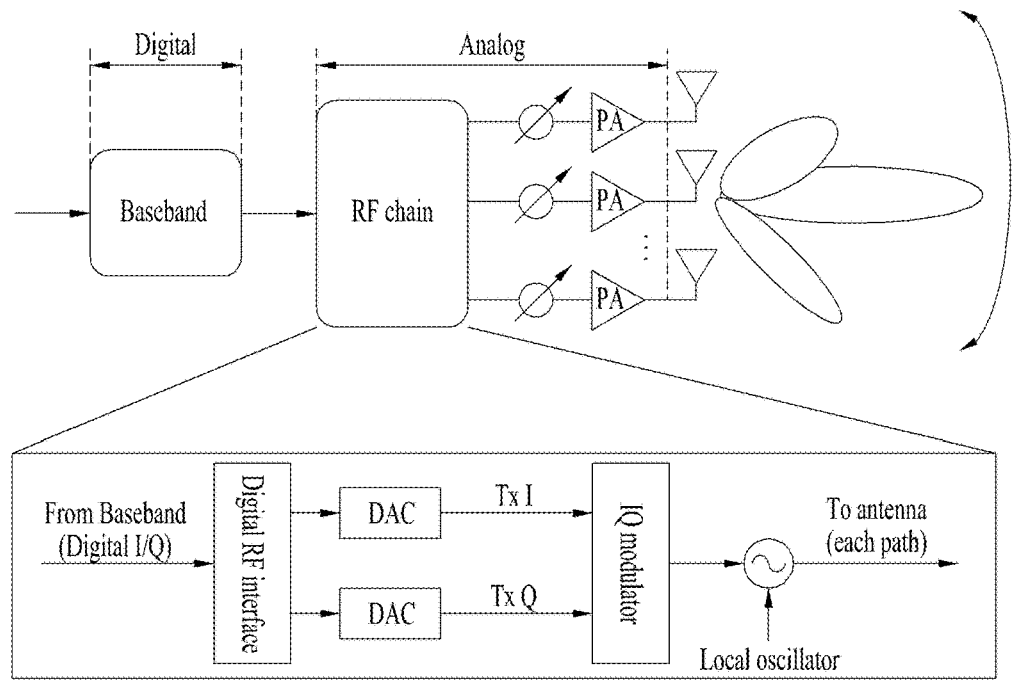
FIG. 1 is a diagram for an example of a legacy analog beamforming technique.
Figure 2:
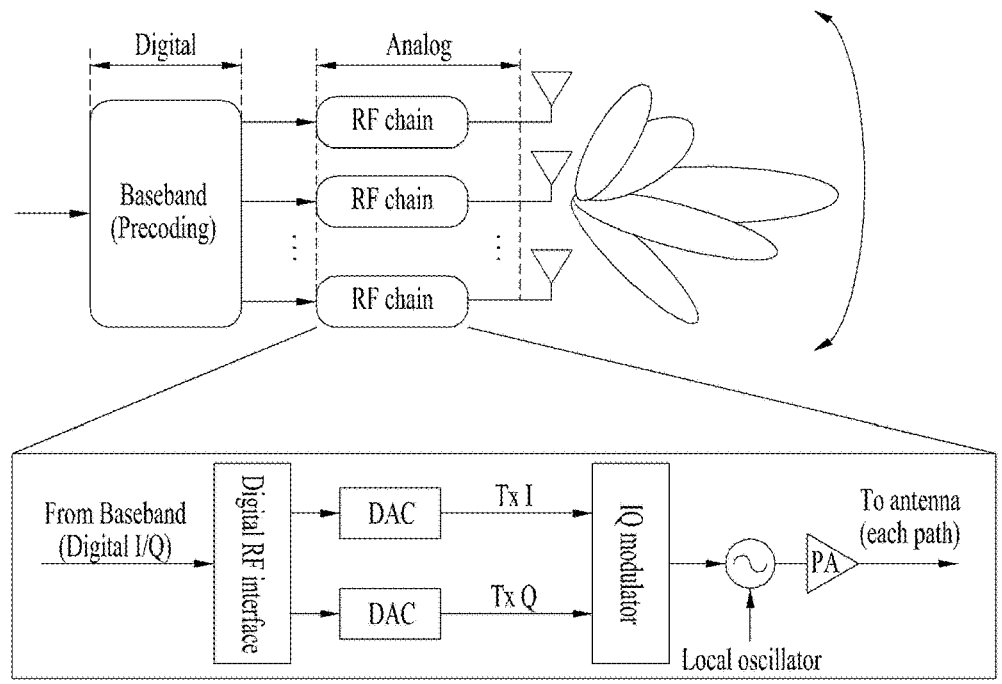
FIG. 2 is a diagram for an example of a legacy digital beamforming technique.
Figure 3:
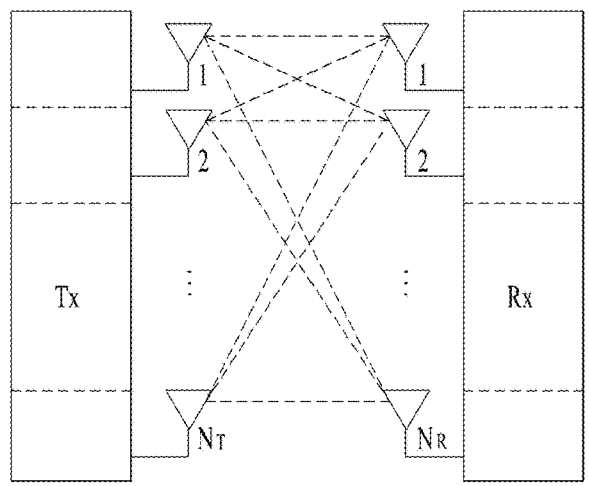
FIG. 3 is a diagram showing the configuration of a general multiple input multiple output (MIMO) system.

The configuration of the general multi-antenna (MIMO) communication system is shown in FIG. 3. $N_T$ transmission antennas are provided in a transmitter and $N_R$ reception antennas are provided in a receiver. If the multiple antennas are used in both the transmitter and the receiver, theoretical channel transmission capacity is increased as compared with the case where multiple antennas are used in only one of the transmitter or the receiver. The increase in the channel transmission capacity is proportional to the number of antennas. Accordingly, transfer rate is improved and frequency efficiency is improved. If a maximum transfer rate in the case where one antenna is used is $R_o$, a transfer rate in the case where multiple antennas are used can be theoretically increased by a value obtained by multiplying $R_o$ by a rate increase ratio $R_i$ as shown in [Equation 1] below. Here, $R_i$ is the smaller of the two values $N_T$ and $N_R$.

$$R_i = \min(N_T, N_R) \qquad \text{[Equation 1]}$$

For example, in a MIMO system using four transmit antennas and four reception antennas, it is possible to theoretically acquire a transfer rate which is four times that of a single antenna system. After the theoretical increase in the capacity of the MIMO system was proved in the mid-1990s, various technologies of substantially improving a data transmission rate have been actively developed up to now. In addition, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The communication method of the MIMO system will be described in more detail using mathematical modeling. As shown in FIG. 3, it is assumed that $N_T$ transmit antennas and $N_R$ reception antennas are present. In transmitted signals, if the $N_T$ transmit antennas are present, the number of pieces of maximally transmittable information is $N_T$. The transmitted information may be expressed by a vector shown in [Equation 2] below.

$$s = [s_1, s_2, \ldots, s_{N_T}]^T \qquad \text{[Equation 2]}$$

The transmitted information $S_1, S_2, \ldots, S_{N_T}$ may have different transmit powers. If the respective transmit powers are $P_1, P_2, \ldots, P_{N_T}$, the transmitted information with adjusted powers may be expressed by a vector shown in [Equation 3] below.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ may be expressed using a diagonal matrix P of the transmit powers as shown in [Equation 4] below.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Considers that the $N_T$ actually transmitted signals $x_1, x_2, \ldots, x_{N_T}$ are configured by applying a weight matrix W to the information vector $\hat{S}$ with the adjusted transmit powers. The weight matrix serves to appropriately distribute the transmitted information to each antenna according to a transport channel state, etc. Such transmitted signals $x_1, x_2, \ldots, x_{N_T}$ may be expressed by using a vector X as shown in [Equation 5] below. $W_{ij}$ denotes a weight between an i-th transmit antenna and j-th information. W is also called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In general, the physical meaning of the rank of the channel matrix may be a maximum number of elements capable of transmitting different information via a given channel. Accordingly, since the rank of the channel matrix is defined as the smaller of the number of independent rows or columns, the rank of the matrix is not greater than the number of rows or columns. The rank rank(H) of the channel matrix H is mathematically expressed by [Equation 6].

$$\text{rank}(H) \leq \min(N_T, N_R) \qquad \text{[Equation 6]}$$

In addition, different information transmitted using the MIMO technology is defined as "transmitted stream" or "stream". Such "stream" may be referred to as "layer". Then, the number of transmitted streams is not greater than the rank which is a maximum number capable of transmitting different information. Accordingly, the channel rank H is expressed by [Equation 7] below.

$$\text{\# of streams} \leq \text{rank}(H) \leq \min(N_T, N_R) \qquad \text{[Equation 7]}$$

where, "# of streams" denotes the number of streams. It should be noted that one stream may be transmitted via one or more antennas.

There are various methods for associating one or more streams with several antennas. These methods will be described according to the kind of the MIMO technology. A method of transmitting one stream via several antennas is referred to as a spatial diversity method and a method of transmitting several streams via several antennas is referred to as a spatial multiplexing method. In addition, a hybrid method which is a combination of the spatial diversity method and the spatial multiplexing method may be used.

In the following, a massive MIMO environment in which the number of transmission and reception antennas is considerably increased is explained. In general, in cellular communication, it is assumed that maximum 8 transmission/reception antennas are applied to a MIMO environment. However, as evolving into massive MIMO, the number of antennas may increase more than dozens or several hundreds of antennas.

If a digital beamforming technique is applied in a massive MIMO environment, since it is necessary to perform signal processing on hundreds of antennas for digital signal processing of a transmitting end through a baseband process, signal processing complexity becomes very complex and hardware implementation complexity becomes very complex because RF chains as many as the number of antennas are necessary. In addition, since it is necessary to perform independent channel estimation on all antennas and have feedback information on a huge MIMO channel consisting of all antennas in case of a FDD (frequency division duplex) system, a pilot and a feedback overhead become very big. On the other hand, if an analog beamforming technique is applied in the massive MIMO environment, hardware complexity of a transmitting end is relatively low, but performance enhancement using multiple antennas is insignificant and flexibility of resource allocation is degraded. In particular, in case of performing broadband transmission, it is very difficult to control a beam according to a frequency.

Therefore, in the massive MIMO environment, it is necessary to have a scheme of configuring a transmitting end of a hybrid type that an analog beamforming structure and a digital beamforming structure are combined instead of exclusively selecting one of the analog beamforming and the digital beamforming techniques Table 1 in the following shows relationship between a performance gain and complexity of the analog beamforming technique and the digital beamforming technique. It is necessary to design a structure of a transmitting end of a hybrid type capable of reducing the hardware implementation complexity of the transmitting end and maximizing a beamforming gain using the massive antenna based on the relationship.

TABLE 1

|  | Easy of beam-forming accuracy control | Multi-carrier beam control | Multi-stream transmission | Hardware complexity (BB process) | Pilot and feedback overhead |
|---|---|---|---|---|---|
| Analog beamforming technique | low | impossible or difficult | impossible or difficult | low | low |
| Digital beamforming technique | high | possible | possible | high | high |

In the following, hybrid beamforming is explained in more detail.

Figure 4:
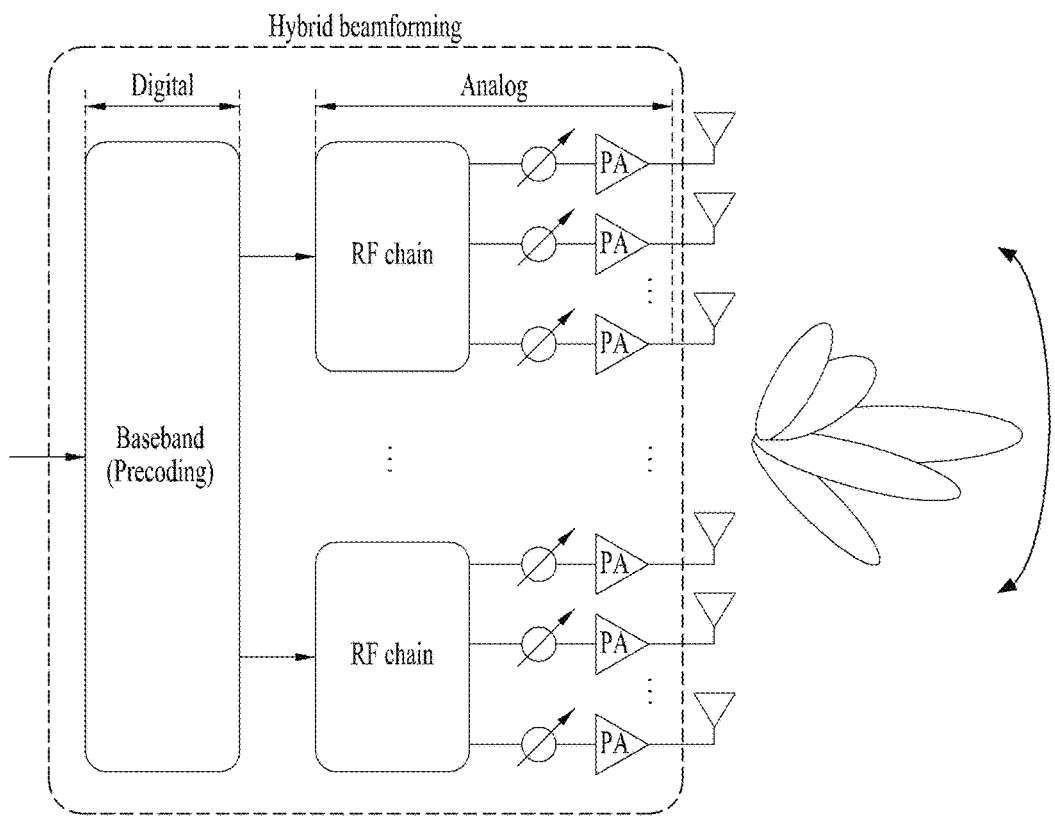
FIG. 4 is a diagram for explaining a concept of hybrid beamforming.

The hybrid beamforming is performed to configure a transmitting end capable of reducing hardware complexity and achieving characteristics of the analog beamforming technique and advantages of the digital beamforming technique. FIG. 4 is a diagram for explaining a concept of hybrid beamforming.

Referring to FIG. 4, the hybrid beamforming is a structure that performs coarse beamforming using the analog beamforming technique and performs multi-stream or multi-user transmission using the digital beamforming technique. Consequently, the hybrid beamforming has a structure for simultaneously performing the analog beamforming technique and the digital beamforming technique to lower implementation complexity of a transmitting end or hardware complexity. Basically, technical issues of the hybrid beamforming are described in the following.

Optimization considering both analog and digital beamforming at the same time has the following difficulties. Basically, the digital beamforming has an identical time-frequency resource and can apply an independent beamforming technique to each user. On the contrary, the analog beamforming has a limitation that it is necessary to apply a common beamforming technique with an identical time-frequency resource. Hence, the limitation causes such an optimization constraint as the number of supported ranks, beam control flexibility, beamforming decomposition, and the like.

The analog beamforming technique, which forms a beam only in a specific direction in the same time-frequency resource, is unable to perform multiple beamforming in all UEs directions at the same time. Hence, there is a problem that it is impossible to simultaneously transmit a UL/DL control channel, a reference signal, a synchronization signal, and the like to all UEs capable of being distributed to all areas of a cell.

In case of performing estimation on an analog/digital beam, although the digital beam is able to use a legacy orthogonal pilot allocation scheme as it is, the analog beam requires a predetermined time-duration as many as the number of beam candidates. This means that time delay required for the analog beam estimation is not small. And, if the analog beam and the digital beam are estimated at the same time, complexity can be considerably increased.

Lastly, while the digital beamforming technique is able to easily perform beamforming for multi-user/stream, the analog beamforming technique performs same beamforming on the entire transmission band. Hence, it is difficult to perform independent beamforming according to a user or a stream. In particular, since it is difficult to support FDMA (e.g., OFDMA) through orthogonal frequency resource allocation, it may be difficult to achieve optimization of frequency resource efficiency.

Among the aforementioned technical issues, an object of the present disclosure is to provide a method capable of solving analog/digital beam estimation complexity for hybrid beamforming.

Figure 5:
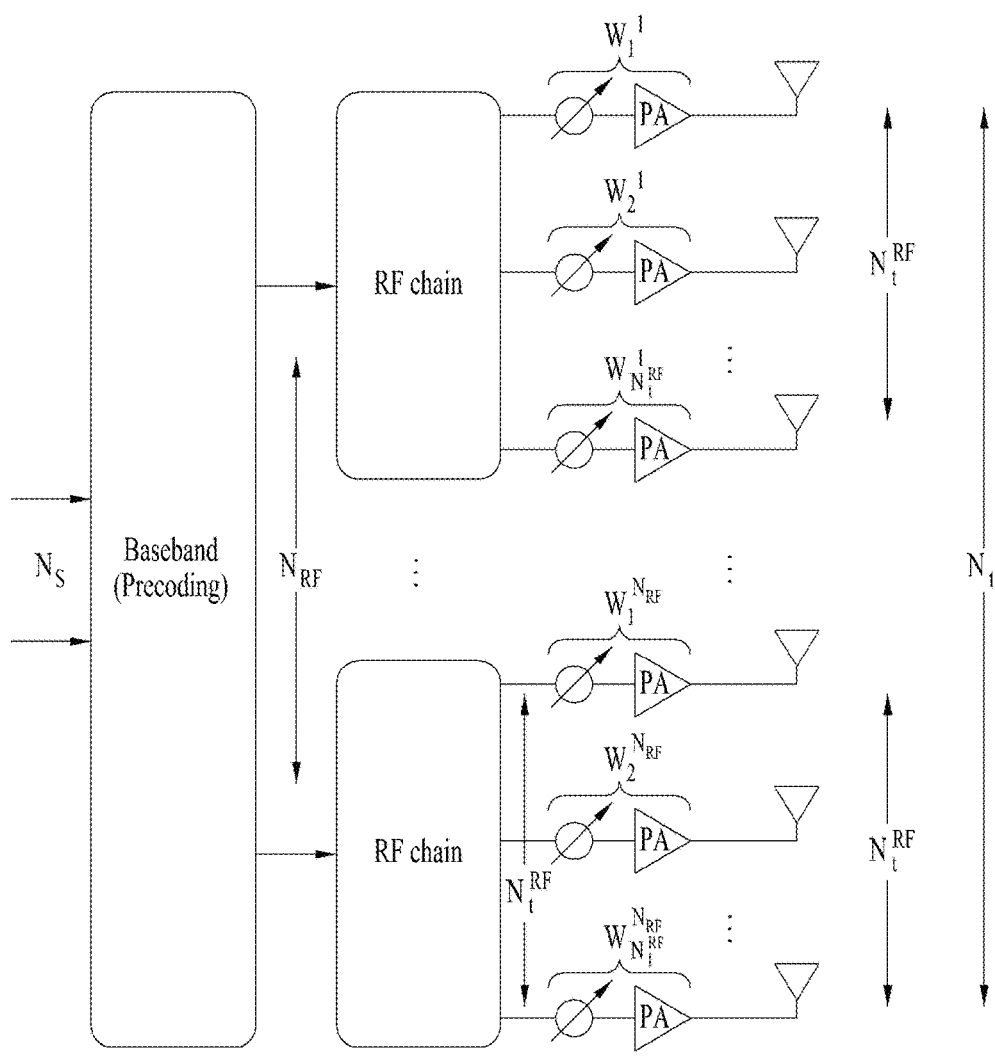
FIG. 5 is a diagram for a structure of a transmitting end that performs hybrid beamforming.

FIG. 5 is a diagram for a structure of a transmitting end that performs hybrid beamforming. In particular, in FIG. 5, assume that the transmitting end performing hybrid beamforming is equipped with $N_t^{RF}$ number of independent antennas only according to an RF chain.

In this case, such a relationship as $N_t = N_t^{RF} \times N_{RF}$ is established between the number of all antennas and the number of antennas according to an RF chain. Since a signal, which has passed a phase shifter and a power amplifier, is independently transmitted to a transmission antenna at the end, it may assume such a system model as [Equation 8] in the following.

$$y_k = H_k F^{RF} F_k^{BB} s_k + z_k \qquad \text{[Equation 8]}$$

In [Equation 8], $y_k$ corresponds to a reception signal vector ($N_r \times 1$) on a subcarrier where an index corresponds to k, $H_k$ corresponds to a $N_r \times N_t$ channel matrix on a subcarrier where an index corresponds to k, $F^{RF}$ corresponds to an RF precoder having a size of $N_t \times N_t$ on all subcarriers, and the RF precoder is identically applied to all subcarriers. Moreover, $F_k^{BB}$ corresponds to a baseband precoder having a size of $N_{RF} \times N_S$ on a subcarrier where an index corresponds to k and the baseband precoder can be changed according to a subcarrier. In addition, $s_k$ corresponds to a transmission signal vector ($N_S \times 1$) on a subcarrier where an index corresponds to k and $z_k$ corresponds to a noise signal vector ($N_r \times 1$) on a subcarrier where an index corresponds to k.

And, the subcarrier index k has values ranging from 0 to $N_{FFT}-1$. In this case, the $N_{FFT}$ is a FFT (Fast Fourier Transform) size and corresponds to the number of total subcarriers. And, $N_{RF}$ indicates the number of total RF chains, $N_t$ indicates the number of total antennas of a transmitting end, and NI corresponds to the number of transmission antennas installed according to an RF chain. Lastly, $N_r$ indicates the number of total antennas of a receiving end and $N_s$ indicates the number of transmission data streams.

Meanwhile, if [Equation 8] is developed for a subcarrier k, it can be represented as [Equation 9] in the following.

$$\begin{bmatrix} y^{(1)} \\ M \\ y^{(N_r)} \end{bmatrix} = \begin{bmatrix} h_{11} & h_{12} & \Lambda & h_{1N_t} \\ h_{21} & h_{22} & \Lambda & h_{2N_t} \\ M & M & O & M \\ h_{N_r1} & h_{N_r2} & \Lambda & h_{N_rN_t} \end{bmatrix} \qquad \text{[Equation 9]}$$

$$F^{RF} \left( \begin{bmatrix} v_{1,1} & v_{1,2} & \Lambda & v_{N_{RF},N_s} \\ v_{2,1} & v_{2,2} & \Lambda & v_{N_{RF},N_s} \\ M & M & O & M \\ v_{N_{RF},1} & v_{N_{RF},2} & \Lambda & v_{N_{RF},N_s} \end{bmatrix} \begin{bmatrix} x^{(1)} \\ M \\ x^{(N_s-1)} \end{bmatrix} \right) + \begin{bmatrix} z^{(1)} \\ M \\ z^{(N_r)} \end{bmatrix}$$

In this case, an equivalent precoding matrix $F^{RF}(N_t \times N_{RF})$ of analog beamforming formed by a phase shifter and a power amplifier after an RF chain can be represented as [Equation 10] in the following.

$$F^{RF} = \begin{bmatrix} w^1_{N_t^{RF}} & 0 & 0 & \Lambda & 0 \\ 0 & w^2_{N_t^{RF}} & 0 & \Lambda & 0 \\ 0 & 0 & w^3_{N_t^{RF}} & \Lambda & 0 \\ M & M & M & O & M \\ 0 & 0 & 0 & \Lambda & w^{N_{RF}}_{N_t^{RF}} \end{bmatrix}$$ [Equation 10]

And, a weight per RF chain of an RF precoder $F^{RF}$ can be represented as [Equation 11] in the following.

$$w^j_{N_t^{RF}} = \begin{bmatrix} w^j_1 \\ w^j_2 \\ M \\ w^j_{N_t^{RF}} \end{bmatrix}$$ [Equation 11]

In the following, a beam radiation pattern of hybrid beamforming for a ULA (uniform linear array) antenna is explained. An array response vector of the ULA antenna can be represented as [Equation 12] in the following.

$$a(\theta) = \begin{bmatrix} 1 & \exp\left(j2\pi \times 1 \times \frac{d}{\lambda}\sin(\theta)\right) & \exp\left(j2\pi \times 2 \times \frac{d}{\lambda}\sin(\theta)\right) & \Lambda & \exp\left(j2\pi \times (N_t-1) \times \frac{d}{\lambda}\sin(\theta)\right) \end{bmatrix}^T$$ [Equation 12]

In [Equation 12], $\lambda$ corresponds to a wave-length and d indicates a distance between antennas. In order to represent an antenna radiation pattern of a hybrid beamformer, for clarity, assume that the number of RF chains corresponds to 4 and the number of analog antennas per RF chain corresponds to 4.

Figure 6:
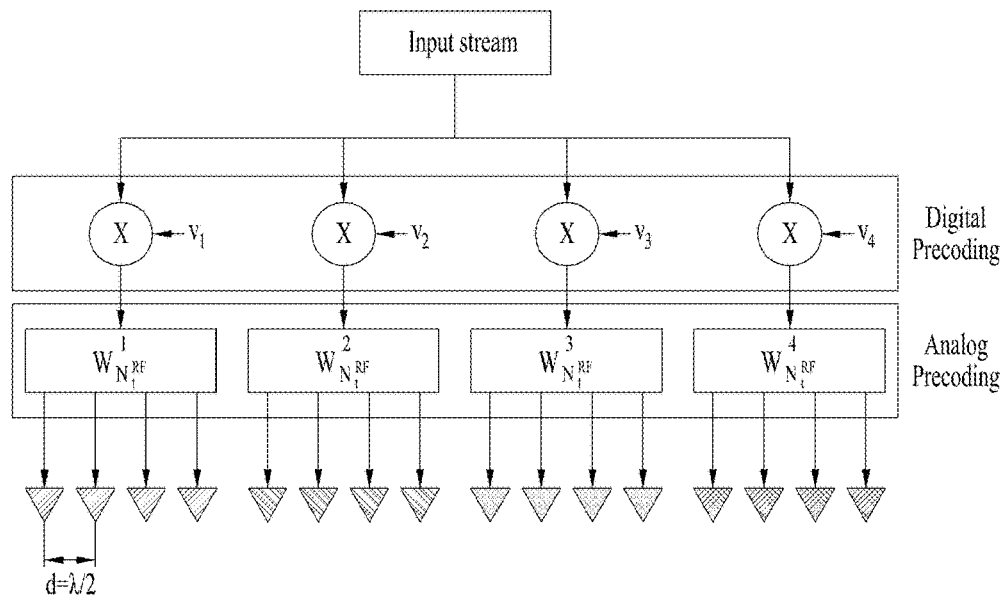
FIG. 6 is a diagram for 16 ULA antenna structure consisting of 4 RF chains.

FIG. 6 is a diagram for 16 ULA antenna structure consisting of 4 RF chains. In particular, in FIG. 6, the total number of transmission antennas corresponds to 16 and it becomes d=$\lambda$/2. A phase shifter and a power amplifier of an analog terminal can be represented by a beamforming weight, i.e., a precoder. The precoder can be represented as [Equation 13] in the following.

$$F^{RF} = \begin{bmatrix} w^1_{N_t^{RF}} & 0 & 0 & 0 \\ 0 & w^2_{N_t^{RF}} & 0 & 0 \\ 0 & 0 & w^3_{N_t^{RF}} & 0 \\ 0 & 0 & 0 & w^4_{N_t^{RF}} \end{bmatrix},$$ [Equation 13]

$$w^j_{N_t^{RF}} = \begin{bmatrix} w^j_1 \\ w^j_2 \\ w^j_3 \\ w^j_4 \end{bmatrix}$$

In this case, a rank-1 weight vector to be applied at a digital beamforming end is defined as [Equation 14] below.

$$F^{BB} = v_1 = [v_1 \quad v_2 \quad v_3 \quad v_4]^T$$ [Equation 14]

At the boresight ($\theta=0°$), all antenna array response vectors to which digital beamforming of [Equation 13] is applied may be represented as [Equation 15]. In this case, a distance d between antennas is assumed to be $\lambda$/2.

[Equation 15]

$$\sum a(\theta) = \sum_{i=0}^{15} a_i(\theta) = (1 + \exp(j\pi \times \sin(\theta)) +$$
$$\exp(j\pi 2 \times \sin(\theta)) +$$
$$\exp(j\pi 3 \times \sin(\theta))) \times v_1 +$$
$$(\exp(j\pi 4 \times \sin(\theta)) +$$
$$\exp(j\pi 5 \times \sin(\theta)) +$$
$$\exp(j\pi 6 \times \sin(\theta)) +$$
$$\exp(j\pi 7 \times \sin(\theta))) \times v_2 +$$
$$(\exp(j\pi 8 \times \sin(\theta)) +$$
$$\exp(j\pi 9 \times \sin(\theta)) +$$
$$\exp(j\pi 10 \times \sin(\theta)) +$$

-continued
$$\exp(j\pi 11 \times \sin(\theta))) \times v_3 +$$
$$(\exp(j\pi 12 \times \sin(\theta)) +$$
$$\exp(j\pi 13 \times \sin(\theta)) +$$
$$\exp(j\pi 14 \times \sin(\theta)) +$$
$$\exp(j\pi 15 \times \sin(\theta))) \times v_4$$

Herein, analog beamforming weights may be set by [Equation 16] below. This is a general analog beamforming weight setting method used to set a boresight for analog beamforming.

$$w^1_1 = \begin{bmatrix} 1 \\ e^{-j\pi \sin(\phi)} \\ e^{-j\pi 2\sin(\phi)} \\ e^{-j\pi 3\sin(\phi)} \end{bmatrix},$$ [Equation 16]

$$w^1_2 = \begin{bmatrix} e^{-j\pi 4\sin(\phi)} \\ e^{-j\pi 5\sin(\phi)} \\ e^{-j\pi 6\sin(\phi)} \\ e^{-j\pi 7\sin(\phi)} \end{bmatrix} = e^{j\pi 4\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

$$w^1_3 = \begin{bmatrix} e^{-j\pi 8\sin(\phi)} \\ e^{-j\pi 9\sin(\phi)} \\ e^{-j\pi 10\sin(\phi)} \\ e^{-j\pi 11\sin(\phi)} \end{bmatrix} = e^{j\pi 8\sin(\theta)} \begin{bmatrix} 1 \\ e^{-j\pi \sin(\phi)} \\ e^{-j\pi 2\sin(\phi)} \\ e^{-j\pi 3\sin(\phi)} \end{bmatrix},$$

-continued $$w_4^1 = \begin{bmatrix} e^{-j\pi 12\sin(\phi)} \\ e^{-j\pi 13\sin(\phi)} \\ e^{-j\pi 14\sin(\phi)} \\ e^{-j\pi 15\sin(\phi)} \end{bmatrix} = e^{j\pi 12\sin(\theta)} \begin{bmatrix} 1 \\ e^{-j\pi\sin(\phi)} \\ e^{-j\pi 2\sin(\phi)} \\ e^{-j\pi 3\sin(\phi)} \end{bmatrix}$$

[Equation 15] may be simplified to [Equation 17] by using [Equation 16].
[Equation 17]

$$\sum a(\theta) = (1 + \exp(j\pi[\sin(\theta) - \sin(\phi)]) + \exp(j\pi 2[\sin(\theta) - \sin(\phi)]) + \exp(j\pi 3[\sin(\theta) - \sin(\phi)])) \times$$
$$(v_1 + \exp(j\pi 4[\sin(\theta) - \sin(\phi)]) \cdot v_2 + \exp(j\pi 8[\sin(\theta) - \sin(\phi)]) \cdot v_3 + \exp(j\pi 12[\sin(\theta) - \sin(\phi)]) \cdot v_4)$$

[Equation 17] may be expressed as [Equation 18].
[Equation 18]

$$\sum a(\theta) = (1 + \exp(j\pi[\sin(\theta) - \sin(\phi)]) + \ldots + \exp(j\pi(N_t^{RF} - 1) \cdot [\sin(\theta) - \sin(\phi)])) \times (v_1 + \exp(j\pi \cdot (N_t^{RF}) \cdot [\sin(\theta) - \sin(\phi)]) \cdot v_2 + \ldots + \exp(j\pi \cdot [N_t^{RF} \cdot (N_{RF} - 1)] \cdot [\sin(\theta) - \sin(\phi)]) \cdot v_{N_{RF}})$$
$$= \left(\sum_{i=1}^{N_t^{RF}} s_i\right) \times \left(\sum_{i=1}^{N_{RF}} t_i\right) = \sum s \times \sum t$$

Herein, φ represents an angle (degrees) that determines analog beamforming. For example, if φ=30° or π/6, a beamforming direction with a maximum beam gain at θ=30° or π/6 is set. Further, a beam boundary vector s in [Equation 18] determines a total valid range. The range of digital beamforming is also limited to a corresponding region. Further, t represents a beam gain/adjustment vector.

Figure 7:
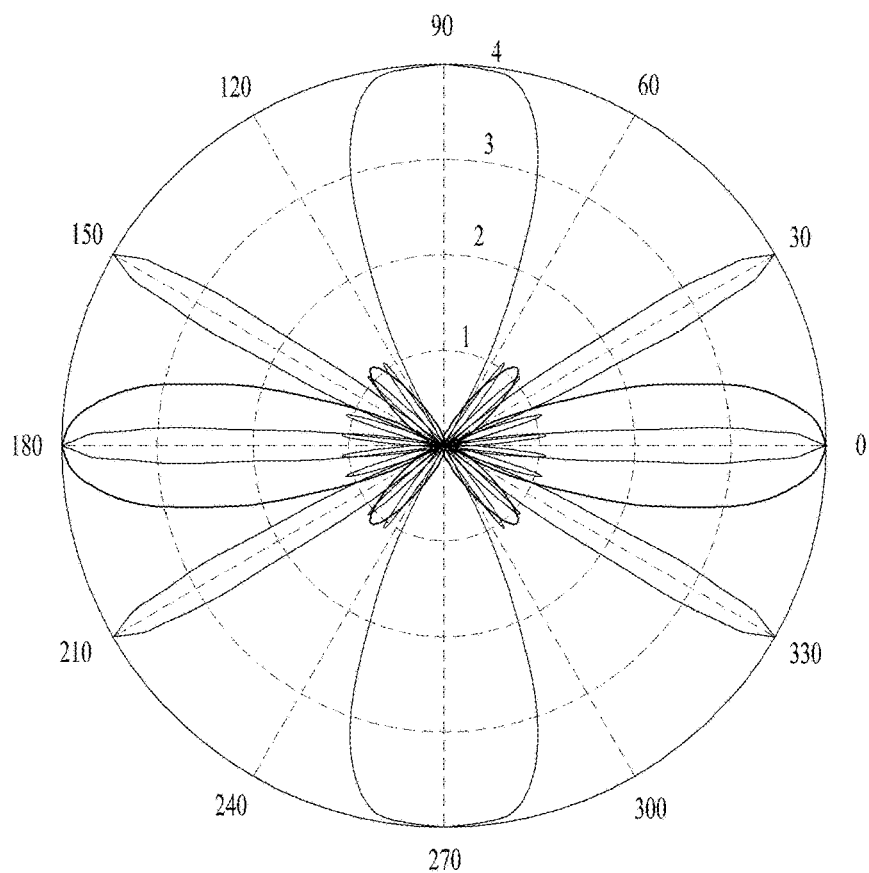
FIG. 7 is a diagram for beam patterns of a beam boundary vector and a beam coordination vector.
Figure 8:
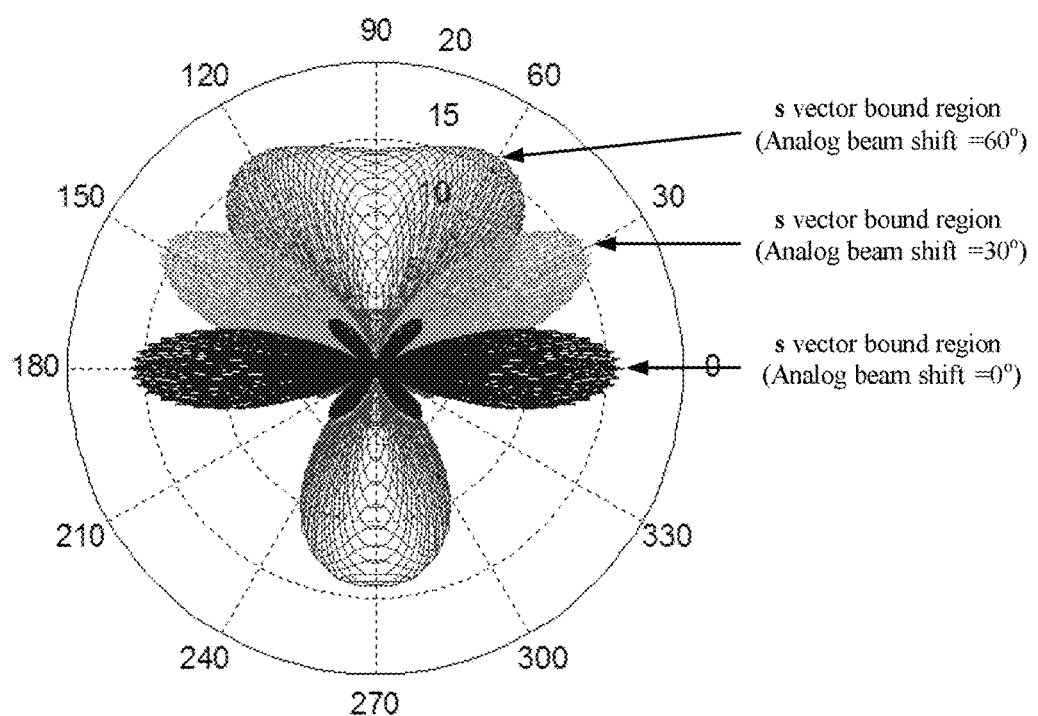
FIG. 8 is a diagram for a beam pattern of a final antenna array response vector according to analog beam shift.

FIG. 7 is a diagram illustrating beam patterns of a beam boundary vector and a beam coordination vector. Particularly, FIG. 7 assumes that $N_t$=16, $N_t^{RF}$=4, $N_{RF}$=4. A beam pattern of the beam boundary vector is denoted by a thick line and a beam pattern of the beam coordination vector is denoted by a thin line. FIG. 8 is a diagram illustrating a beam pattern of a final antenna array response vector according to analog beam shift. Similarly, FIG. 8 assumes that $N_t$=16, $N_t^{RF}$=4, $N_{RF}$=4. In FIG. 8, an accumulated beam pattern result to which $v_1$=[$v_1$ $v_2$ $v_3$ $v_4$]T for determining digital beamforming is applied is shown. Referring to FIGS. 7 and 8, it may be noted that the range of a valid beam is restricted by a beam boundary vector s.

Now, a description will be given of the principle of designing a digital precoder for hybrid beamforming.

For hybrid beamforming, a digital beam coefficient is designed separately as an analog beam pre-compensation part and a fine-tuning part. A final digital codebook is designed in consideration of analog beamforming updated in a long-term period. That is, the same design rule may be maintained irrespective of an analog beam angle.

Figure 9:
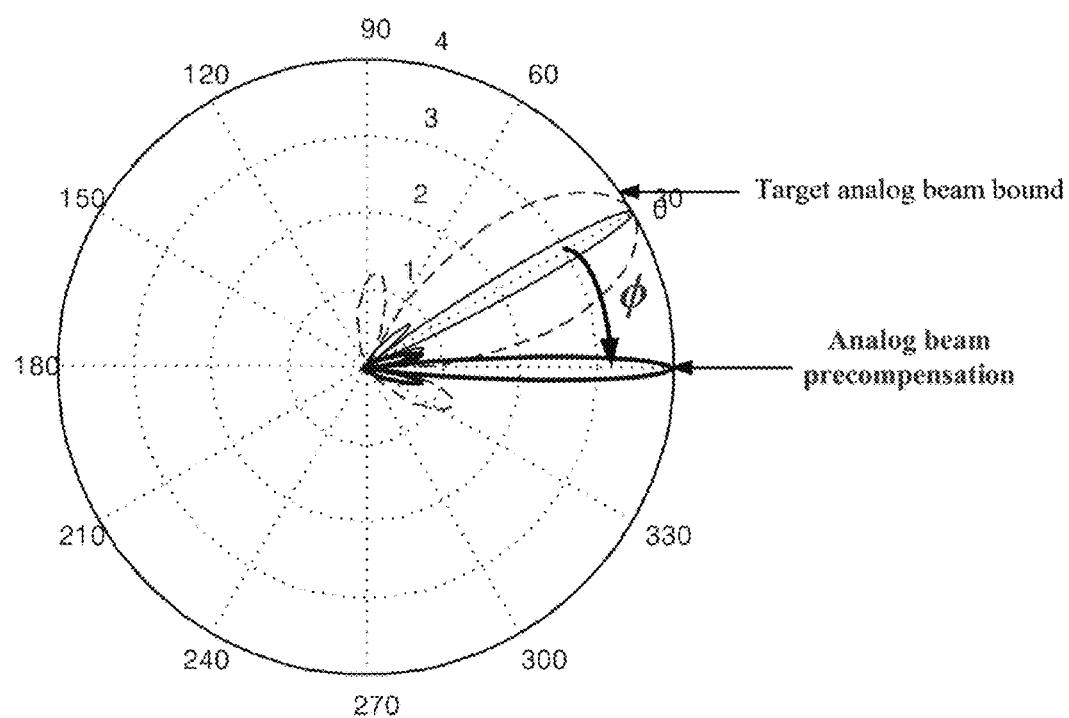
FIG. 9 is a diagram illustrating pre-compensation for analog beamforming in a hybrid beamforming process.

FIG. 9 is a view illustrating pre-compensation for analog beamforming in a hybrid beamforming process.

Referring to FIG. 9, accurate beamforming is possible by eliminating an analog beamforming setting value Φ through pre-compensation in digital beamforming. Accordingly, a base station (BS) determines a coefficient for analog beam pre-compensation in digital beamforming by using an inverted phase for an analog beam weight. The analog beam pre-compensation coefficient changes the direction of a digital beam to a 0-degree boresight irrespective of an analog beamforming angle, as illustrated in FIG. 9.

Figure 10:
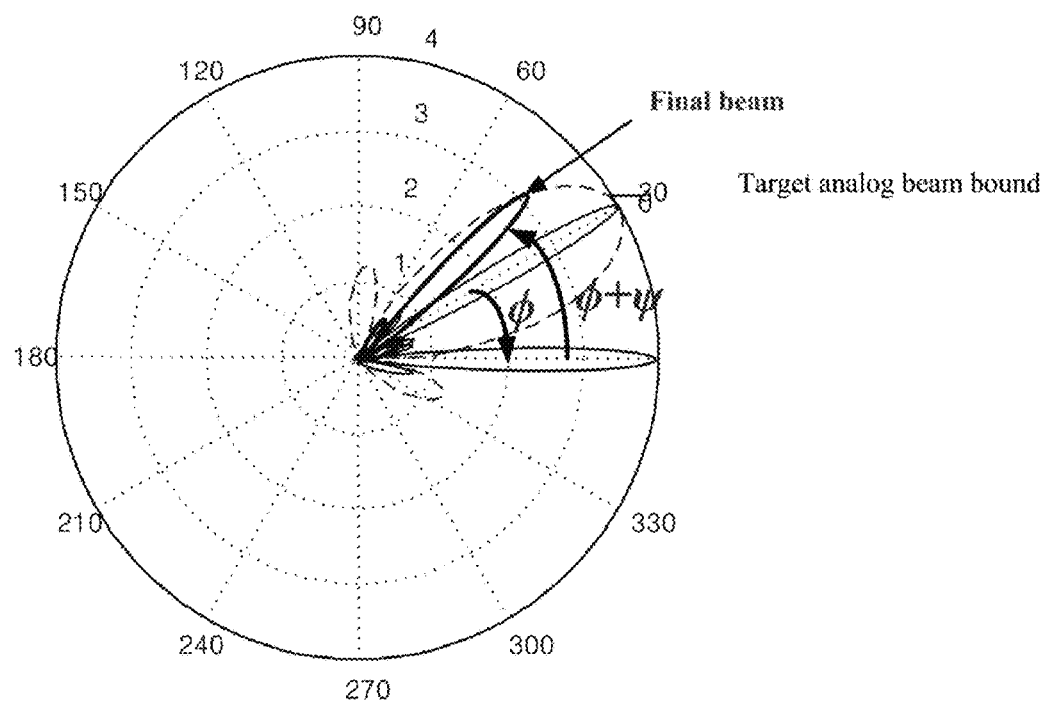
FIG. 10 is a diagram illustrating a final hybrid beam to which pre-compensation for analog beamforming is applied.

FIG. 10 illustrates a final hybrid beam to which pre-compensation for analog beamforming is applied. For a final beam setting value of a digital beamforming coefficient, a weight is set based on the direction of a final beam with respect to 0° irrespective of an analog beamforming setting value. This is done because the digital beamforming coefficient is a combination of two beamforming coefficients. That is, the analog beam pre-compensation means adjusting a beam to a 0° direction, as illustrated in FIG. 10. Therefore, a final target setting should be re-calculated eventually with respect to 0°. Accordingly, the direction of the final beam is set to φ+ψ.

Based on the above description, actual digital beamforming coefficients may be designed by [Equation 18], relying on the digital precoder design principle for hybrid beamforming.

$$v = \begin{bmatrix} v_1 \\ v_2 \\ \vdots \\ v_{N_{RF}} \end{bmatrix} = \begin{bmatrix} 1 \\ e^{j\pi \cdot N_t^{RF} \cdot 1 \cdot (\sin(\phi) - \sin(\phi+\psi))} \\ \vdots \\ e^{j\pi \cdot N_t^{RF} \cdot (N_{RF}-1) \cdot (\sin(\phi) - \sin(\phi+\psi))} \end{bmatrix} =$$

$$= \begin{bmatrix} 1 \\ e^{j\pi \cdot N_t^{RF} \cdot 1 \cdot \sin(\phi)} e^{-j\pi \cdot N_t^{RF} \cdot 1 \cdot \sin(\phi+\psi)} \\ \vdots \\ e^{j\pi \cdot N_t^{RF} \cdot (N_{RF}-1) \cdot \sin(\phi)} e^{-j\pi \cdot N_t^{RF} \cdot (N_{RF}-1) \cdot \sin(\phi+\psi)} \end{bmatrix}$$

$$= \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \oplus \begin{bmatrix} 1 \\ e^{-j\pi \cdot N_t^{RF} \cdot 1 \cdot \sin(\phi+\psi)} \\ \vdots \\ e^{-j\pi \cdot N_t^{RF} \cdot (N_{RF}-1) \cdot \sin(\phi+\psi)} \end{bmatrix}$$

[Equation 18]

⊕: Hadamard product

Herein, if the direction of a final beam is set to 35° by rotating total beams by φ=30° through analog beamforming and additionally by ψ=5° through digital beamforming in an environment in which $N_t$=16, $N_t^{RF}$=4, and $N_{RF}$=4, the digital beamforming coefficients are given as [Equation 19].

$$v = = \begin{bmatrix} v_1 \\ v_2 \\ v_3 \\ v_4 \end{bmatrix} = \begin{bmatrix} 1 \\ e^{j\pi \cdot 4 \cdot 1 \cdot \sin(30°)} \\ e^{j\pi \cdot 4 \cdot 2 \cdot \sin(30°)} \\ e^{j\pi \cdot 4 \cdot 3 \cdot \sin(30°)} \end{bmatrix} \oplus \begin{bmatrix} 1 \\ e^{-j\pi \cdot 4 \cdot 1 \cdot \sin(35°)} \\ e^{-j\pi \cdot 4 \cdot 2 \cdot \sin(35°)} \\ e^{-j\pi \cdot 4 \cdot 3 \cdot \sin(35°)} \end{bmatrix} =$$

$$\begin{bmatrix} 1 \\ e^{j\pi \cdot 4 \cdot \sin(30°)} \\ e^{j\pi \cdot 8 \cdot \sin(30°)} \\ e^{j\pi \cdot 12 \cdot \sin(30°)} \end{bmatrix} \oplus \begin{bmatrix} 1 \\ e^{-j\pi \cdot 4 \cdot \sin(35°)} \\ e^{-j\pi \cdot 8 \cdot \sin(35°)} \\ e^{-j\pi \cdot 12 \cdot \sin(35°)} \end{bmatrix}$$

[Equation 19]

A final antenna array response vector reflecting [Equation 19] is given as [Equation 20].

$$\sum a(\theta) = (1 + \exp(j\pi[\sin(\theta) - \sin(\phi)]) + \qquad \text{[Equation 20]}$$
$$\exp(j\pi 2[\sin(\theta) - \sin(\phi)]) +$$
$$\exp(j\pi 3[\sin(\theta) - \sin(\phi)])) \times$$
$$(v_1 + \exp(j\pi 4[\sin(\theta) - \sin(\phi)]) \cdot v_2 +$$
$$\exp(j\pi 8[\sin(\theta) - \sin(\phi)]) \cdot v_3 +$$
$$\exp(j\pi 12[\sin(\theta) - \sin(\phi)]) \cdot v_4)$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$\begin{pmatrix} 1 + \exp(j\pi 4[\sin(\theta) - \sin(\phi) + \sin(\phi) - \\ \sin(\phi + \psi)]) + \exp(j\pi 8[\sin(\theta) - \sin(\phi) + \\ \sin(\phi) - \sin(\phi + \psi)]) + \exp(j\pi 12[\sin(\theta) - \\ \sin(\phi) + \sin(\phi) - \sin(\phi + \psi)]) \end{pmatrix}$$
$$= (1 + \exp(j\pi[\sin(\theta) - \sin(\phi)]) +$$
$$\exp(j\pi 2[\sin(\theta) - \sin(\phi)]) +$$
$$\exp(j\pi 3[\sin(\theta) - \sin(\phi)])) \times$$
$$(1 + \exp(j\pi 4[\sin(\theta) - \sin\phi + (\psi)]) +$$
$$\exp(j\pi 8[\sin(\theta) - \sin(\phi + \psi)]) +$$
$$\exp(j\pi 12[\sin(\theta) - \sin(\phi + \psi)]))$$

For $\phi=30°$ in [Equation 20], if a final beamforming rotation angle is set to 35° by applying $\psi+5°$, the final antenna array response vector is determined by [Equation 21].

$$\sum a(\theta) = (1 + \exp(j\pi[\sin(\theta) - \sin(30°)]) + \qquad \text{[Equation 21]}$$
$$\exp(j\pi 2[\sin(\theta) - \sin(30°)]) +$$
$$\exp(j\pi 3[\sin(\theta) - \sin(30°)])) \times$$
$$(1 + \exp(j\pi 4[\sin(\theta) - \sin(35°)]) +$$
$$\exp(j\pi 8[\sin(\theta) - \sin(35°)]) +$$
$$\exp(j\pi 12[\sin(\theta) - \sin(35°)]))$$

Figure 11:
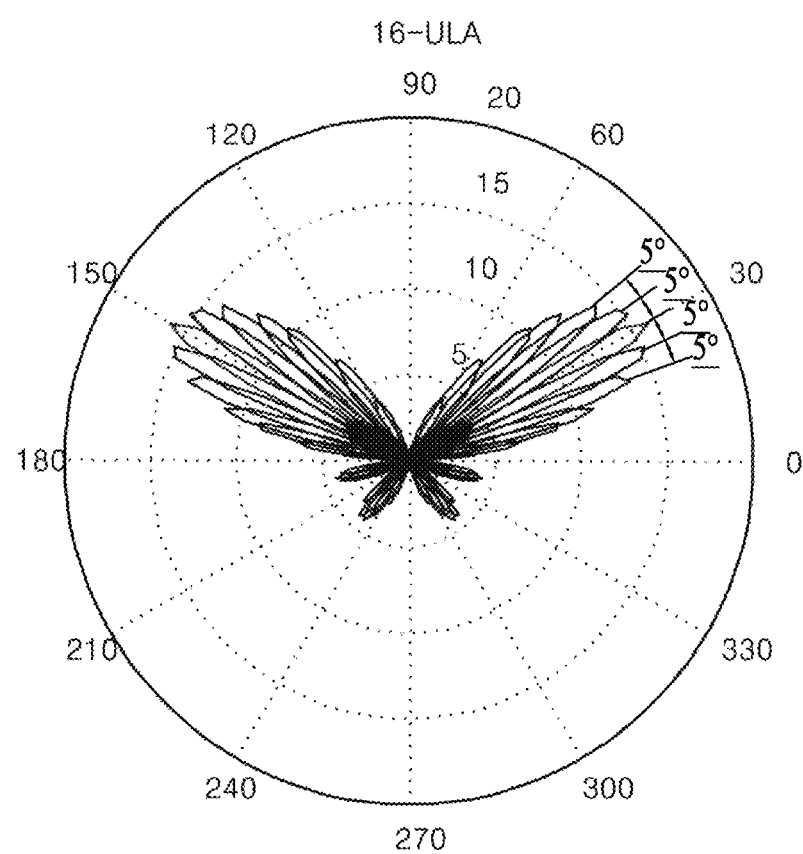
FIG. 11 is a diagram illustrating a final antenna array response vector obtained by performing fine-tuning digital beamforming with respect to a fixed analog beamforming angle.

FIG. 11 illustrates a final antenna array response vector achieved by performing fine-tuning digital beamforming with respect to a fixed analog beamforming angle. Specifically, FIG. 11 illustrates a final antenna array response vector achieved by performing fine-tuning digital beamforming at $\psi=0, \pm5°, \pm10°, \pm15°$ with respect to $\phi=30°$ As illustrated in FIG. 11, it may be noted that a hybrid beam is controlled accurately in units of 5 degrees through pre-compensation for analog beamforming.

In the present disclosure, a description will be given of a PMI generation and feedback method of a user equipment (UE) based on the afore-described principle of generating a hybrid beamforming codebook.

First Embodiment

A first embodiment of the present disclosure proposes that the UE generates an analog beam-based codebook using analog beam information acquired in a beam scanning step.

First of all, separate codebooks are defined by [Equation 22]. In [Equation 22], a final codebook P is the Hadamard product of a codebook X determined based on a beam ID feedback and an analog beam-dependent digital codebook P'.

$$P = X \oplus P' \qquad \text{[Equation 22]}$$

$$\begin{cases} X = \{X_1, X_2, X_3, X_4, \ldots \} \\ P' = \{P_1, P_2, P_3, P_4, \ldots \} \\ X: \text{Analog } BF \text{ coefficient} \\ P': \text{Digital } BF \text{ coefficient} \\ \oplus: \text{Hadamard product} \end{cases}$$

Referring to [Equation 22], it may be noted that the codebook X for analog beam pre-compensation, which has not been reflected in deriving a legacy digital codebook or PMI, is defined. Specifically, the codebook X for analog beam pre-compensation is generated by [Equation 23], and the UE should know the value of $\phi$ to generate the final codebook.

$$X = \begin{bmatrix} 1 \\ e^{j\pi \cdot N_t^{RF} \cdot 1 \cdot \sin(\phi)} \\ \vdots \\ e^{j\pi \cdot N_t^{RF} \cdot (N_{RF}-1) \cdot \sin(\phi)} \end{bmatrix} \qquad \text{[Equation 23]}$$

In determining the value of $\phi$, the analog beam pre-compensation codebook X is configured, using an azimuth angle $\phi$ corresponding to a beam ID selected in the DL beam scanning step. That is, the UE determines the value of $\phi$ required to generate the codebook X, while feeding back the beam ID selected in the beam scanning step. Although analog beams may be mapped to azimuth angles $\phi$ in a one-to-one correspondence as illustrated in [Table 2], if some analog beams are overlapped, a single azimuth angle may be set for a set of specific analog beam indexes, as illustrated in [Table 3].

TABLE 2

| Analog beam index (Beam ID) | Azimuth angle for analog beam generation ($\varphi$) |
|---|---|
| 1 | 0° |
| 2 | 15° |
| 3 | 30° |
| 4 | 45° |
| 5 | 60° |
| 6 | 75° |
| . | . |
| . | . |
| . | . |

TABLE 3

| Analog beam index (Beam ID) | Azimuth angle for analog beam generation ($\phi$) |
|---|---|
| 1 | 0° |
| 2 | |
| 3 | 15° |
| 4 | |

TABLE 3-continued

| Analog beam index (Beam ID) | Azimuth angle for analog beam generation (φ) |
|---|---|
| 5 | 30° |
| 6 | |
| . | . |
| . | . |
| . | . |

Second Embodiment

A second embodiment of the present disclosure proposes that the UE generates an analog beam-based codebook using analog beam information acquired by signaling of the BS by the UE.

Specifically, unlike the first embodiment, when the UE generates the codebook X, the BS determines the azimuth angle φ and indicates the determined azimuth angle φ to the UE. That is, while the UE determines φ on its own based on a feedback analog beam ID index, simultaneously with beam scanning in a first embodiment, the BS determines φ independently or based on feedback beam ID information received from the UE, and transmits the corresponding information to the UE in a second embodiment. Since the azimuth angle φ may be different for each UE, the azimuth angle information may be transmitted mainly in the following two methods.

(1) First, it may be considered that corresponding information is transmitted to UEs within a cell on a common control channel. That is, the BS uses the common control channel in allocating an azimuth angle φ to each UE within the cell.

For example, transmit power control (TPC) commands for PUCCHs are transmitted in DCI format 3/3A on a common control channel, PDCCH. Which information in the power control information of DCI format 3 is to be read by a UE is predefined in a TPC-PDCCH-Config information element of an RRC configuration.

The TPC-PDCCH-Config information element of the RRC configuration is configured as illustrated in [Table 4].

TABLE 4

```
-- ASN1START
TPC-PDCCH-Config ::=    CHOICE {
    release                 NULL,
    setup                   SEQUENCE {
        tpc-RNTI                BIT STRING (SIZE (16)),
        tpc-Index               TPC-Index
    }
}
TPC-Index ::=           CHOICE {
    indexOfFormat3          INTEGER (1..15),
    indexOfFormat3A         INTEGER (1..31)
}
-- ASN1STOP
```

In [Table 4], indexOfFormat3 or indexOfFormat3A of TPC-Index specifies a position that the UE is to read. For example, it is assumed that UE_A has received the following common power control information as illustrated in [Table 5]. In this case, if indexOfFormat3=1 in the RRC configuration, TPC command number 1 is power control information for UE_A.

TABLE 5

| Format 3 (Release 8) - TPC-RNTI | | |
|---|---|---|
| Field Name | Length (Bits) | Comment |
| TPC command number 1 | 2 | |
| TPC command number 2 | 2 | |
| TPC command number 3 | 2 | |
| ... | | |
| TPC command number N | 2 | The size of N is dependent on the payload size of DCI format 0 for the system BW |

In this proposal, the same principle may also be used. First, the quantization level of φ is determined. For example, if the range of φ satisfying 0°≤φ≤180° is divided into 16 levels, $N_{Lev}$ bits (=4 bits) is required to indicate φ to each UE. If there are $N_{UE}$ users in total within the cell, the total amount of broadcast information is $4 \times N_{UE}$. Therefore, the overall information configuration of the common control channel may be as illustrated in [Table 6]. However, to use the corresponding method, the position of the index of a field that each UE is to read should be indicated beforehand to the UE by RRC signaling.

TABLE 6

| Index | Azimuth angle of analog beam (φ) | Length (Bits) | UE |
|---|---|---|---|
| 1 | $φ_1$ | $N_{Lev}$ | UE#1 |
| 2 | $φ_2$ | $N_{Lev}$ | UE#2 |
| 3 | $φ_3$ | $N_{Lev}$ | UE#3 |
| ... | ... | ... | ... |
| $N_{UE}$ | $φ_{N_{UE}}$ | $N_{Lev}$ | UE#$N_{UE}$ |
| Total information length | | | $N_{UE} \times N_{Lev}$ |

(2) Or, it may be considered that the corresponding information is transmitted to the UEs within the cell on dedicated control channels. Due to the use of no common control channel, this method obviates the need for higher-layer signaling, that is, RRC signaling which might otherwise be performed first for acquisition of azimuth angle information. Therefore, since the individual control channels are used, an azimuth angle field may be added to a legacy control channel (i.e., the corresponding field may be added to a legacy DCI format), or a new DCI format may be added. The size of the azimuth angle information may be different according to the quantization level of φ.

Third Embodiment

Or, it may be considered that the UE defines only a digital codebook as a feedback codebook P' by separating an analog beam-based codebook from a legacy digital codebook, and feeds back a derived PMI set to the BS. In this case, the final codebook P is generated in the BS.

The proposed hybrid beamforming codebook is the Hadamard product of the codebook X determined based on a beam ID feedback and the analog beam-dependent digital codebook P', as described in [Equation 22]. Herein, P' is defined by φ and ψ, as described in [Equation 24], and the azimuth angle φ is determined in the analog beam scanning step. ψ is defined according to a target fine-tuning resolution aimed by digital beamforming.

$$P' = \begin{bmatrix} 1 \\ e^{-j\pi \cdot N_t^{RF} \cdot 1 \cdot sin(\phi+\psi)} \\ \vdots \\ e^{-j\pi \cdot N_t^{RF} \cdot (N_{RF}-1) \cdot sin(\phi+\psi)} \end{bmatrix} \quad \text{[Equation 24]}$$

Figure 12:
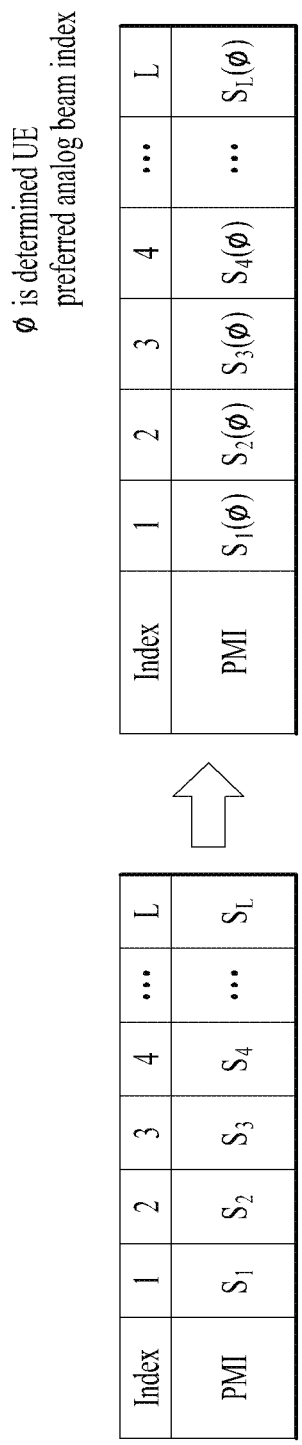
FIG. 12 is a diagram comparing a legacy digital PMI configuration with a digital PMI configuration of the present disclosure.

FIG. 12 is a diagram comparing a legacy digital PMI configuration with a digital PMI configuration of the present disclosure. While a legacy codebook is predefined deterministically, the proposed codebook is determined based on preferred beam indexes obtained by analog beam scanning. The total structure of a feedback codebook is achieved by [Equation 25], and then an appropriate PMI is derived from the codebook and fed back to the BS. The total size of the codebook matrix P' is $N_{RF} \times L$ where $N_{RF}$ represents the number of digital ports or RF chains in a transmitter, and L represents the maximum number of transmission layers.

$$P' = \begin{bmatrix} 1 & 1 & 1 & \cdots & 1 \\ e^{-j\pi \cdot N_t^{RF} \cdot 1 \cdot sin(\phi+\psi_1)} & e^{-j\pi \cdot N_t^{RF} \cdot 1 \cdot sin(\phi+\psi_2)} & e^{-j\pi \cdot N_t^{RF} \cdot 1 \cdot sin(\phi+\psi_3)} & \cdots & e^{-j\pi \cdot N_t^{RF} \cdot 1 \cdot sin(\phi+\psi_L)} \\ \vdots & \vdots & \vdots & \ddots & \vdots \\ e^{-j\pi \cdot N_t^{RF} \cdot (N_{RF}-1) \cdot sin(\phi+\psi_1)} & e^{-j\pi \cdot N_t^{RF} \cdot (N_{RF}-1) \cdot sin(\phi+\psi_2)} & e^{-j\pi \cdot N_t^{RF} \cdot (N_{RF}-1) \cdot sin(\phi+\psi_3)} & \cdots & e^{-j\pi \cdot N_t^{RF} \cdot (N_{RF}-1) \cdot sin(\phi+\psi_L)} \end{bmatrix} \quad \text{[Equation 25]}$$

That is, in the third embodiment of the present disclosure, the UE configures a feedback codebook only for the analog beam-dependent digital codebook P' by separating the analog beam-dependent digital codebook P' from the codebook X determined based on an analog beam index, and feeds back information about the selected codebook to the BS. Finally, the BS produces the final codebook P using the feedback codebook P' and analog beam ID received from the UE.

Fourth Embodiment

In a fourth embodiment of the present disclosure, the UE defines a feedback codebook by combining an analog beam-based codebook with a legacy digital codebook, and feeds back a derived PMI set to the BS. In this case, the UE produces the final codebook P and feeds back the corresponding information to the BS.

Compared to the third embodiment, the UE defines the final codebook P=X⊕P' obtained by combining the codebook X determined based on the beam ID feedback and the analog beam-dependent digital codebook P', as a final codebook or a feedback codebook in the fourth embodiment. That is, the UE generates the final codebook by directly reflecting the analog beam ID determined by beam scanning.

Subsequently, the UE configures the codebook P according to the azimuth angle φ of an analog beam by the following [Equation 26] and feeds back a selected PMI to the BS.

$$P = \begin{bmatrix} 1 & 1 & 1 & \cdots & 1 \\ e^{j\pi \cdot N_t^{RF} \cdot 1 \cdot sin(\phi)} e^{-j\pi \cdot N_t^{RF} \cdot 1 \cdot sin(\phi+\psi_1)} & e^{j\pi \cdot N_t^{RF} \cdot 1 \cdot sin(\phi)} e^{-j\pi \cdot N_t^{RF} \cdot 1 \cdot sin(\phi+\psi_2)} & \cdots & e^{j\pi \cdot N_t^{RF} \cdot 1 \cdot sin(\phi)} e^{-j\pi \cdot N_t^{RF} \cdot 1 \cdot sin(\phi+\psi_L)} \\ \vdots & \vdots & \ddots & \vdots \\ e^{j\pi \cdot N_t^{RF} \cdot (N_{RF}-1) \cdot sin(\phi)} e^{-j\pi \cdot N_t^{RF} \cdot (N_{RF}-1) \cdot sin(\phi+\psi_1)} & e^{j\pi \cdot N_t^{RF} \cdot (N_{RF}-1) \cdot sin(\phi)} e^{-j\pi \cdot N_t^{RF} \cdot (N_{RF}-1) \cdot sin(\phi+\psi_2)} & \cdots & e^{j\pi \cdot N_t^{RF} \cdot (N_{RF}-1) \cdot sin(\phi)} e^{-j\pi \cdot N_t^{RF} \cdot (N_{RF}-1) \cdot sin(\phi+\psi_L)} \end{bmatrix} \quad \text{[Equation 25]}$$

The above [Equation 26] may be simplified to [Equation 27].

$$P = \begin{bmatrix} 1 & 1 & \cdots & 1 \\ e^{-j\pi \cdot N_t^{RF} \cdot 1 \cdot (sin(\phi)-sin(\phi+\psi_1))} & e^{-j\pi \cdot N_t^{RF} \cdot 1 \cdot (sin(\phi)-sin(\phi+\psi_2))} & \cdots & e^{-j\pi \cdot N_t^{RF} \cdot 1 \cdot (sin(\phi)-sin(\phi+\psi_L))} \\ \vdots & \vdots & \ddots & \vdots \\ e^{-j\pi \cdot N_t^{RF} \cdot (N_{RF}-1)(sin(\phi)-sin(\phi+\psi_1))} & e^{-j\pi \cdot N_t^{RF} \cdot (N_{RF}-1)(sin(\phi)-sin(\phi+\psi_2))} & \cdots & e^{-j\pi \cdot N_t^{RF} \cdot (N_{RF}-1)(sin(\phi)-sin(\phi+\psi_L))} \end{bmatrix} \quad \text{[Equation 27]}$$

While the above proposals have been described on the assumption of a hybrid beamforming structure, the present disclosure is not limited thereto. For example, the present disclosure is also applicable to a case in which an analog beamforming end is replaced with a digital beamforming end. That is, the present disclosure is also applicable to a hierarchical digital beamforming structure through antenna sub-grouping.

The proposals have been described in the context of, but not limited to, a DL scenario in which a BS transmits a signal to a UE. The present disclosure may be applied to any combination of a transmitter and a receiver. For example, the present disclosure is also applicable to a UE-to-BS UL transmission scenario, a UE-to-UE transmission scenario, or a BS-to-BS transmission scenario.

Figure 13:
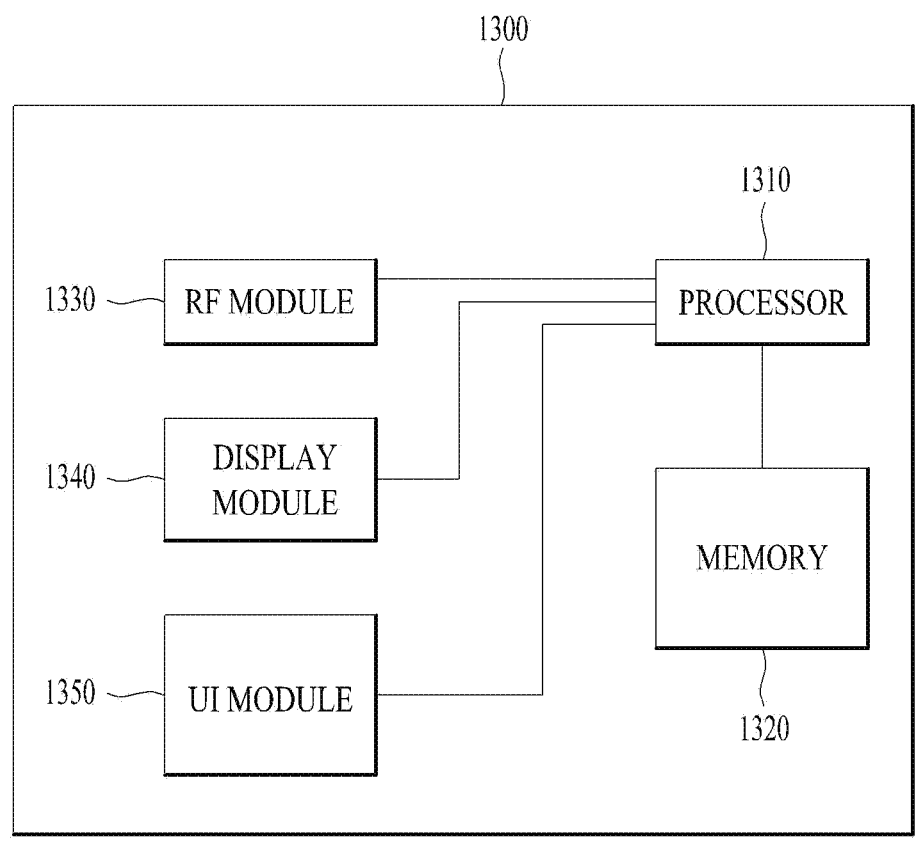
FIG. 13 is a block diagram of a communication apparatus according to an embodiment of the present disclosure.

FIG. 13 is a block diagram of a communication apparatus according to an embodiment of the present disclosure.

Referring to FIG. 13, a communication apparatus 1300 includes a processor 1310, a memory 1320, an RF module 1330, a display module 1340 and a user interface module 1350.

The communication apparatus 1300 is shown for convenience of description and some modules thereof may be omitted. In addition, the communication apparatus 1300 may further include necessary modules. In addition, some modules of the communication apparatus 1300 may be subdivided. The processor 1310 is configured to perform an operation of the embodiment of the present disclosure described with reference to the drawings. For a detailed description of the operation of the processor 1310, reference may be made to the description associated with FIGS. 1 to 12.

The memory 1320 is connected to the processor 1310 so as to store an operating system, an application, program code, data and the like. The RF module 1330 is connected to the processor 1310 so as to perform a function for converting a baseband signal into a radio signal or converting a radio signal into a baseband signal. The RF module 1330 performs analog conversion, amplification, filtering and frequency up-conversion or inverse processes thereof. The display module 1340 is connected to the processor 1310 so as to display a variety of information. As the display module 1340, although not limited thereto, a well-known device such as a Liquid Crystal Display (LCD), a Light Emitting Diode (LED), or an Organic Light Emitting Diode (OLED) may be used. The user interface module 1350 is connected to the processor 1310 and may be configured by a combination of well-known user interfaces such as a keypad and a touch screen.

The above-described embodiments are proposed by combining constituent components and characteristics of the present disclosure according to a predetermined format. The individual constituent components or characteristics should be considered optional on the condition that there is no additional remark. If required, the individual constituent components or characteristics may not be combined with other components or characteristics. In addition, some constituent components and/or characteristics may be combined to implement the embodiments of the present disclosure. The order of operations disclosed in the embodiments of the present disclosure may be varied. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this document, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc.

The embodiments of the present disclosure can be implemented by a variety of means, for example, hardware, firmware, software, or a combination thereof. In the case of implementing the present disclosure by hardware, the present disclosure can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present disclosure are implemented by firmware or software, the present disclosure can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

The invention claimed is:

1. A method of receiving, from a base station, a signal to which hybrid beamforming is applied by a user equipment in a wireless communication system, the method comprising:
   acquiring information about a first precoder for first beamforming in the hybrid beamforming;
   generating information about a pre-compensation precoder for the first beamforming, using the information about the first precoder;
   reporting the information about the pre-compensation precoder to the base station; and
   receiving, from the base station, a signal to which the pre-compensation precoder, the first beamforming, and second beamforming are applied,
   wherein the pre-compensation precoder is configured to adjust a boresight of a signal to which the first precoder for the first beamforming is applied to zero degrees, and a second precoder for the second beamforming is configured to transmit the signal in a final boresight with respect to the zero-degree boresight.

2. The method according to claim 1, wherein the acquisition of information about a first precoder for first beamforming comprises:
   detecting a beam index corresponding to the first beamforming by a beam scanning process; and
   acquiring the information about the first precoder corresponding to the detected beam index.

3. The method according to claim 1, wherein the acquisition of information about a first precoder for first beamforming comprises receiving the information about the first precoder from the base station.

4. The method according to claim 1, wherein the reporting of the information about the pre-compensation precoder comprises:
configuring a final precoder with the pre-compensation precoder and the second precoder; and
reporting information about the final precoder to the base station.

5. The method according to claim 1, wherein the acquisition of information about a first precoder for first beamforming comprises detecting a beam index corresponding to the first beamforming, and
wherein the information about the pre-compensation precoder for the first beamforming includes information about the beam index corresponding to the first beamforming.

6. The method according to claim 1, wherein the first beamforming is analog beamforming, and the second beamforming is digital beamforming.

7. A user equipment in a wireless communication system to which hybrid beamforming is applied, the user equipment comprising:
a wireless communication module configured to transmit and receive signals to and from a base station; and
a processor configured to process the signals,
wherein the processor is configured to generate information about a pre-compensation precoder for first beamforming, using information about a first precoder for the first beamforming in the hybrid beamforming, and to control the wireless communication module to report the information about the pre-compensation precoder to the base station, and the wireless communication module is configured to receive, from the base station, a signal to which the pre-compensation precoder, the first beamforming, and second beamforming are applied, and
wherein the pre-compensation precoder is configured to adjust a boresight of a signal to which the first precoder for the first beamforming is applied to zero degrees, and a second precoder for the second beamforming is configured to transmit the signal in a final boresight with respect to the zero-degree boresight.

8. The user equipment according to claim 7, wherein the processor is configured to acquire the information about the first precoder, using a beam index corresponding to the first beamforming, detected by a beam scanning process.

9. The user equipment according to claim 7, wherein the processor is configured to control the wireless communication module to receive the information about the first precoder from the base station.

10. The user equipment according to claim 7, wherein the processor is configured to configure a final precoder with the pre-compensation precoder and the second precoder, and control the wireless communication module to report information about the final precoder to the base station.

11. The user equipment according to claim 7, wherein the processor is configured to detect a beam index corresponding to the first beamforming, and
wherein the information about the pre-compensation precoder for the first beamforming includes information about the beam index corresponding to the first beamforming.

12. The user equipment according to claim 7, wherein the first beamforming is analog beamforming, and the second beamforming is digital beamforming.

* * * * *